United States Patent

Rigolini

[15] 3,675,556
[45] July 11, 1972

[54] DOUBLE EXPOSURE PREVENTION SYSTEM AND CAMERA

[72] Inventor: Venerio J. Rigolini, Brooklyn, N.Y.
[73] Assignee: Whitehouse Products, Inc., Brooklyn, N.Y.
[22] Filed: Oct. 2, 1970
[21] Appl. No.: 77,439

[52] U.S. Cl. .................................. 95/31 FL, 95/31 FM
[51] Int. Cl. ........................................... G03b 19/04
[58] Field of Search ........................... 95/31 FL, 31 FM

[56] References Cited

UNITED STATES PATENTS 3,247,773  4/1966  Doblin et al. .................... 95/31
3,498,199  3/1970  Everberg ........................ 95/31 X

*Primary Examiner*—Samuel S. Matthews
*Assistant Examiner*—Michael L. Gellner
*Attorney*—John A. Howson

[57] ABSTRACT

A camera having a compact metering device to control film advancement and a double exposure prevention system which permits operation of the shutter when there is no film in the camera, but blocks the shutter's operation when the camera is loaded with film until an unexposed portion of the film is advanced to the point where it is suitably framed for taking a picture. A metering pawl moves rearwardly in the camera under the influence of a tension spring to permit operation of the shutter when the camera is unloaded. When the camera is loaded with film the member is engaged either with the film or with the film cartridge through a perforation in the film, thus preventing the camera from being operated until the film is suitably advanced to ready the camera for taking a picture.

6 Claims, 6 Drawing Figures

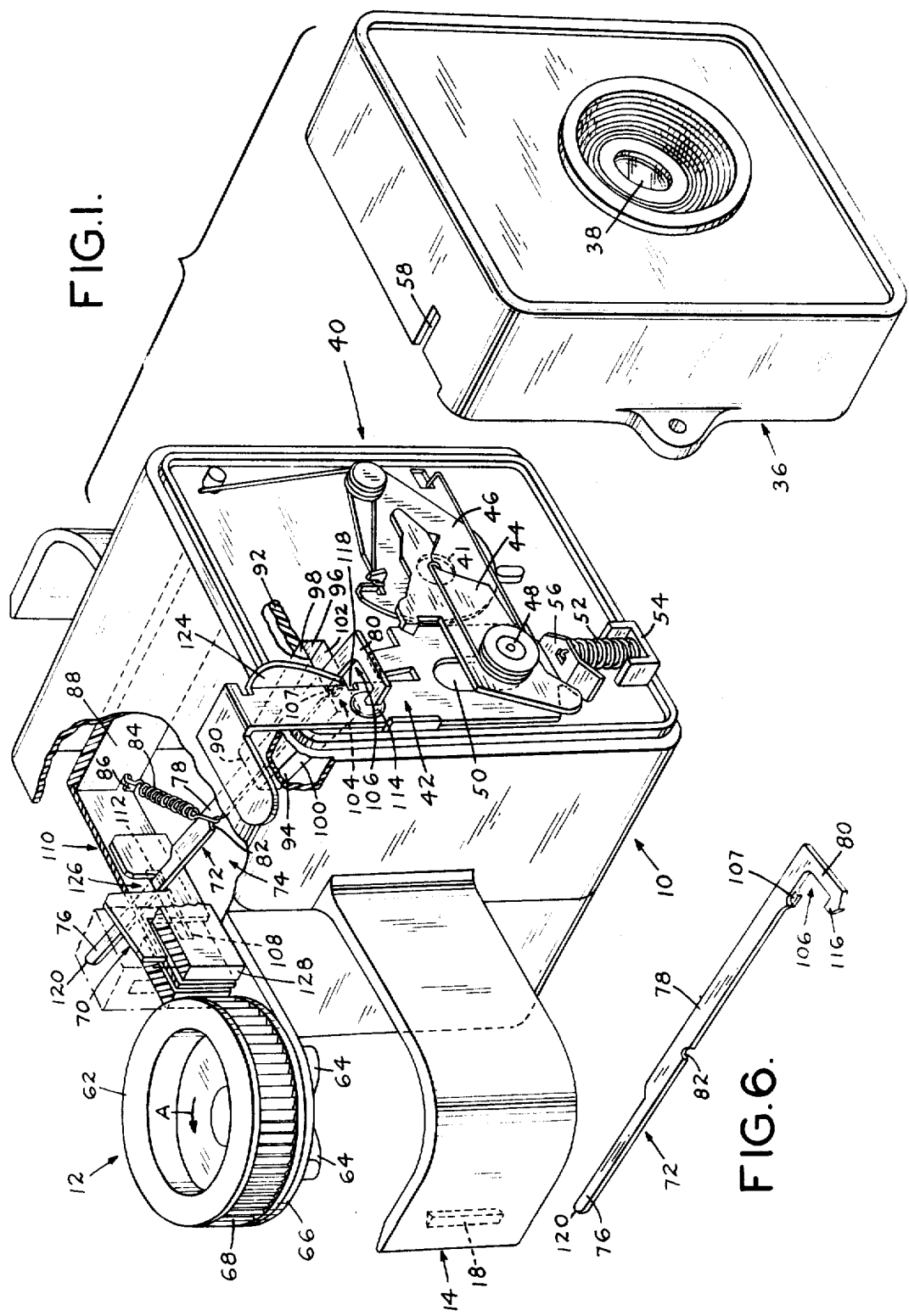

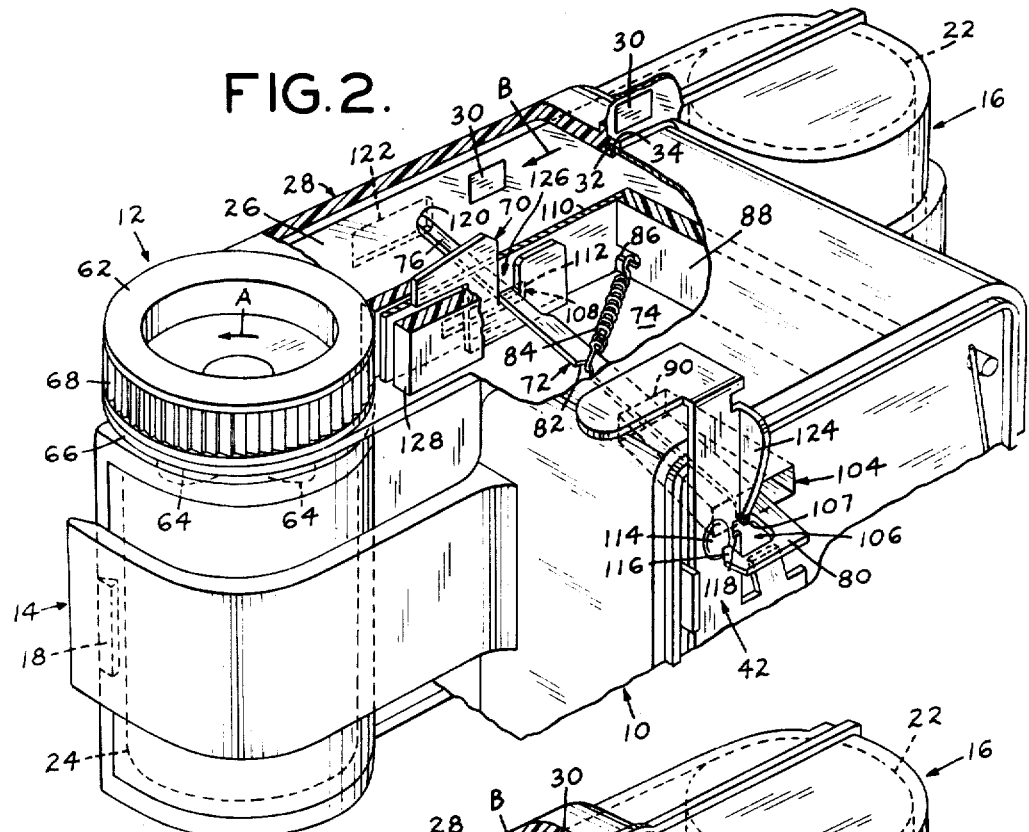

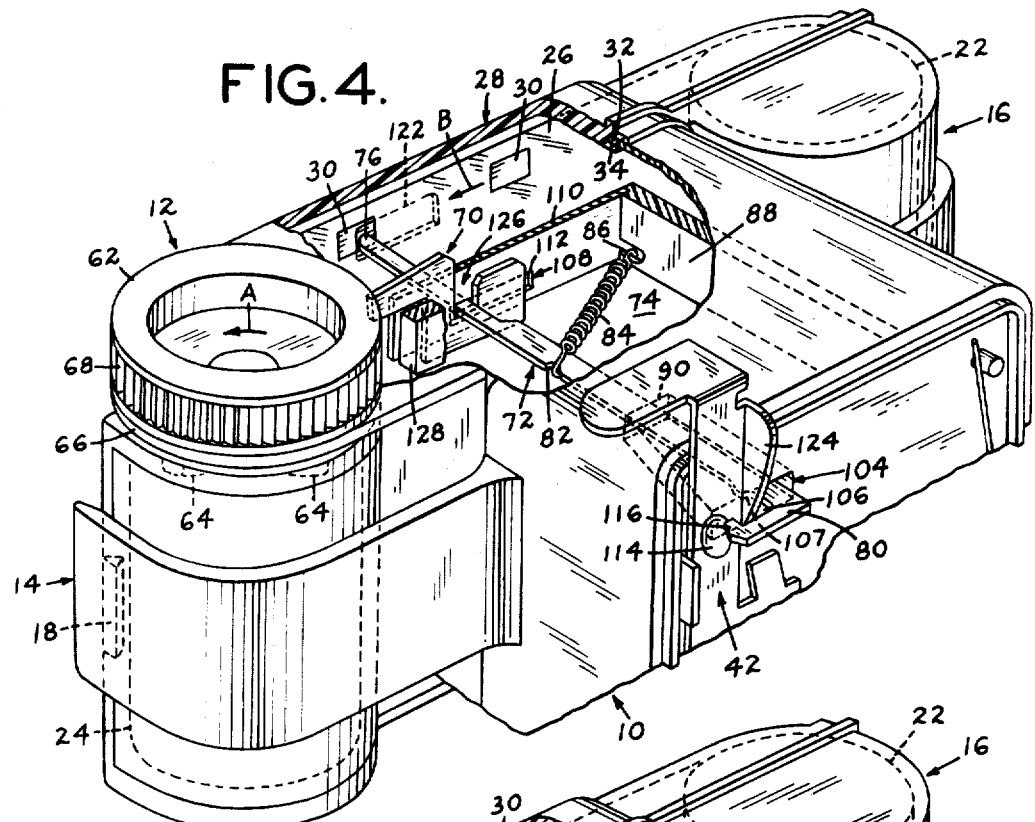
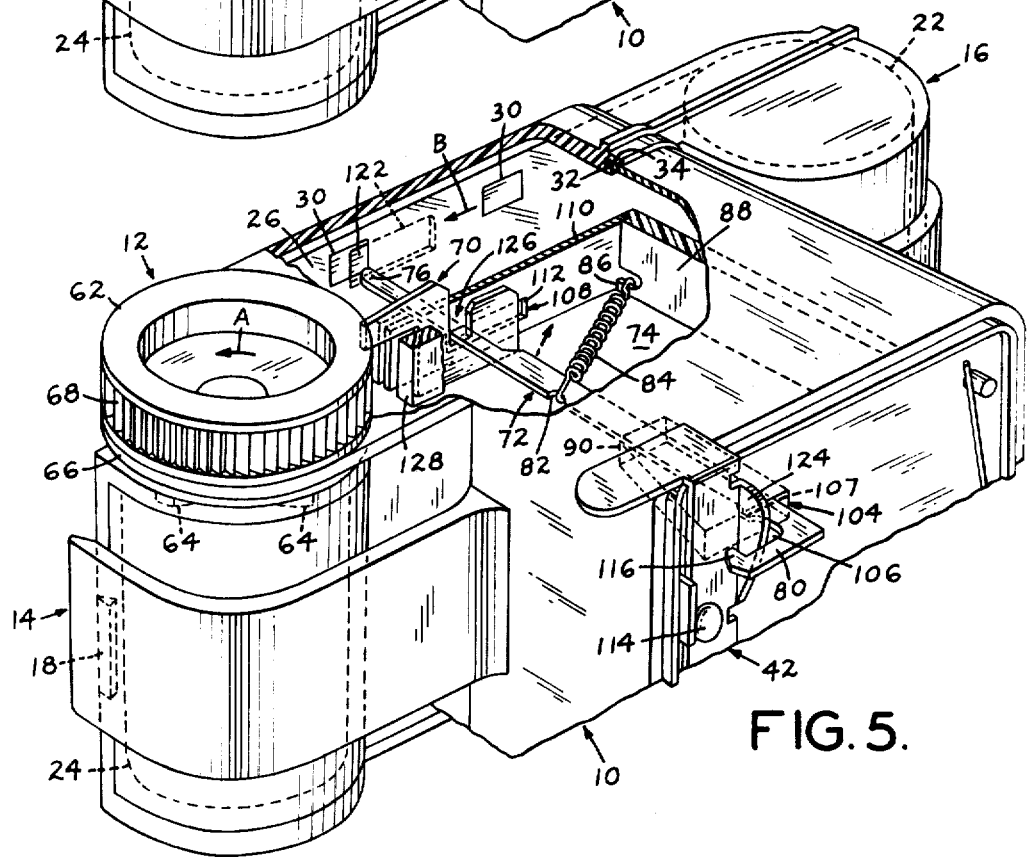

DOUBLE EXPOSURE PREVENTION SYSTEM AND CAMERA

CROSS REFERENCE TO RELATED APPLICATION

Reference is made to related U.S. Pat. No. 3,605,591 issued on Sept. 20, 1972 which is commonly assigned and co-pending with this application.

BACKGROUND OF THE INVENTION

This invention relates to photographic cameras and more particularly to systems for preventing double exposures in hand-held still cameras.

Heretofore, these cameras despite their popularity have not been entirely satisfactory particularly when bought for and used by children. One reason for this is that children like to take pictures or make believe they are taking pictures. Their enjoyment includes operating the shutter and hearing it click. For the most part cameras which have heretofore been provided with double exposure prevention mechanisms have prevented the user from doing this unless the camera was either loaded and the film advanced to an unexposed frame, or the shutter was separately mechanically cocked between operations. Though in many 35 mm. cameras cocking the shutter is a relatively easy operation, these cameras are expensive and most children have no access to one. This is not true, however, for less expensive cameras such as, for example, those which use preloaded film cartridges of the type including spaced parallel spools and a narrow compartment between the spools through which film, having spaced metering perforations, is adapted to pass as it is wound off one spool onto another. An example of such a cartridge is found in U.S. Pat. No. 3,138,081, issued June 23, 1964 to Nerwin. These less expensive cameras are generally provided with self-cocking shutters and double exposure prevention systems which make it impossible to operate the shutter without having film in the camera and the film in a position ready for taking a picture. Since few families can afford to provide sufficient film to enable the child to snap the shutter as often as he likes, this inhibits the picture taking interest of the child and is undesirable.

It is therefore one object of this invention to provide a novel double exposure prevention system for photographic cameras.

Another object is to provide a hand-held still camera having this double exposure prevention system with the ability to have its shutter release lever operate to actuate the shutter whenever there is no film loaded in the camera.

A further object is to provide a camera having the above characteristics which will prevent double exposures from being made when a film cartridge is loaded in the camera.

Still another object is to provide a camera having the above characteristics which when loaded with film will prevent the shutter release lever from being depressed except when the film has been advanced to the point where the next picture is ready to be taken.

Further, other and additional objects and advantages of the invention will become obvious from the brief summary of the invention and detailed description particularly when taken in connection with the drawings and the appended claims.

BRIEF SUMMARY OF THE INVENTION

This invention comprises a camera having a one-piece metering pawl which is so constructed and arranged that it controls locking of the film winding mechanism when the film has been advanced to the point where an unexposed portion has been suitably framed for taking the next picture. In addition, the camera prevents the shutter release lever from being depressed if the camera is loaded with film, but the film has not been advanced in preparation for taking the next picture. In addition, the metering pawl permits depression of the shutter release lever, and the resulting actuation of the shutter, not only when an unexposed portion of the film is suitably framed for taking a picture, but also when there is no film or cartridge in the camera at all.

This function is accomplished by providing the pawl with a nib-like projection and a recess or notch adjacent one end and by providing a tension spring which pulls the pawl rearwardly in the camera when it is not loaded with film to align the recess with a notch in the shutter release member allowing the latter to be depressed. When the camera is loaded with film the nib-like projection lies in this notch to prevent a picture from being taken except when the film is suitably advanced for taking the next picture. A sensing finger at the other end of the pawl helps meter the film in the manner disclosed in U.S. Pat. No. 3,605,591.

BRIEF DESCRIPTION OF THE DRAWINGS

FIG. 1 is an exploded partial front perspective view of the preferred embodiment of a clip-on camera according to the invention with the metering pawl shown in the position it assumes when there is no film loaded in the camera;

FIG. 2 is a partial front perspective view of the embodiment of FIG. 1 showing the pawl in the position it assumes when the camera is loaded with film and is ready to be advanced;

FIG. 3 is a partial front perspective view of the preferred embodiment of FIG. 1 showing the pawl in the position it assumes when it has entered a metering hole in the film before the film winding mechanism has been locked;

FIG. 4 is a partial front perspective view of the preferred embodiment showing the pawl in the position which it assumes when the film winding mechanism has been locked and the camera is ready for a picture to be taken;

FIG. 5 is a partial front perspective view of the preferred embodiment showing the shutter release lever partially depressed just before the shutter is tripped and the sensing finger portion of the pawl removed from the film hole; and FIG. 6 is a perspective view of the pawl according to the preferred embodiment of the invention.

DETAILED DESCRIPTION OF THE INVENTION

Referring now to FIGS. 1 & 2 of the drawings, the preferred embodiment of the camera according to the invention comprises a camera body 10 and a film winding mechanism 12 known per se. Attached to opposite sides of the body 10 are a pair of curved arms 14 also known per se which are attached to embrace a film cartridge 16 (see FIG. 2) of the type disclosed in the aforementioned U.S. Pat. No. 3,138,081. The camera body 10 is releasably clipped onto the cartridge 16 by a lug 18 mounted on each of the arms 14 adjacent their ends 20.

As disclosed in U.S. Pat. No. 3,138,081 the cartridge 16 contains a film supply spool 22 at one end and a take-up spool 24 at the opposite end. The film 26 is threaded through a flat hollow body portion 28 and is provided with a plurality of metering holes or perforations 30 which are useful in framing an unexposed portion of the film with respect to the camera for taking successive pictures. The camera body 10 is made lighttight with respect to the cartridge 16 by a rectangular rib 32 on the camera body and a mating recess 34 in the cartridge.

Mounted on the front of the camera body 10 is a cover 36 containing a light admitting lens 38 behind which lies an impact shutter mechanism 40 which includes a opening 41, a shutter release member 42, a tripping member 44 and a shutter member 46. The details and operation of this shutter mechanism are disclosed in the aforementioned U.S. Pat. No. 3,605,591 and will therefore not be discussed in detail herein. It should be noted, however, that the shutter release member 42 is slidably mounted about a pin 48 in the camera body so as to be reciprocable in a vertical direction a distance permitted by its slideway 50 in which the pin 48 is mounted. A compression spring 52 mounted between a cup 54 attached adjacent the bottom of the camera body 10 and the bottom portion 56 of the shutter release member 42 urges this member upwardly at all times. A guide 58 integral with the front of the camera body assists in keeping the movement of the shutter release member properly oriented with respect to the shutter and the camera. The tripping member 44 is pivotally mounted about the pin 48 in front of the shutter release member 42.

The film winding mechanism 12 comprises a winding knob 62 having a plurality of downwardly depending teeth 64 for engagement with the film take-up spool in the cartridge 16. The knob 62 is rotatably mounted in a ring-like portion 66 of the camera body in such a way as to be rotatable only in a counterclockwise direction as shown by the arrow A in FIG. 1. It has a plurality of axially oriented peripheral teeth 68 which help the user to grasp the knob and wind the film. Locking of this knob so that it cannot rotate is accomplished by a locking pawl 70 whose operation is disclosed in the above-mentioned U.S. Pat. No. 3,605,591 to which reference is made for the details which are not hereinafter discussed.

The camera 10 also includes a metering pawl 72 which is mounted within a chamber 74 and comprises a flat piece of sheet metal. It has a sensing finger portion 76 at its rear end, a middle portion 78 and a generally L-shaped front portion 80. A notch 82 is formed in the pawl's middle portion for connection with one end of a tension spring 84, the other end of which is attached to a rear portion 86 of the right-hand side wall 88 of the chamber 74. This causes the pawl to always be urged rearwardly and towards the right-hand side wall 88 just mentioned.

The front portion 80 of the pawl 72 extends through an opening 90 in the chanber's front wall 92 for cooperation with the shutter release member 42. Opening 90 is formed by a rearwardly extending protrusion 94 which extends rearwardly from the front wall 92 and comprises right, upper, left and lower walls 96, 98, 100 and 102 respectively which form a trapezoidal chamber 104 which is open at both ends. The front portion 80 of the pawl extends forwardly through the chamber 104 and includes a recess or notch 106 at the right-hand side of the corner of the L portion.

Referring again to FIG. 1, the pawl 72 performs its functions in the following manner. When no film is loaded in the camera 10 the sensing finger 76 extends through an aperture 108 in the rear wall 110 of chamber 74. Due to the tension of the spring 84 this finger is pulled to the right-hand most end 112 of the aperture 108 and is urged rearwardly until a rearwardly extending protrusion 116 on the front portion 80 of the pawl contacts a depression 114 in the front surface of the shutter release member 42. In this condition the right-hand edge of the middle portion 78 of the pawl lies against the right wall 96 at the rear of the chamber 104 and the notch 106 in the forward portion 80 of the pawl 72 mates with a notch 118 in the right-hand edge of the shutter release member 42 so the latter can be depressed and the shutter tripped.

When a cartridge loaded with film is clipped onto the camera (as in FIG. 2) the rear end 120 of the sensing finger 76 contacts the film or the rear wall 122 of the cartridge and is urged forwardly. This forward movement of the pawl 72 drives the recess 106 out of alignment with the notch 118 and brings a nib-like projection 107 contiguous with this recess in line with the notch 118 in the shutter release member 42, thus preventing it from being depressed. As the winding knob 62 is rotated counterclockwise in the direction illustrated the film 26 is advanced from right to left in the cartridge (see arrow B in FIGS. 2 & 3) until one of the metering perforations 30 comes opposite the sensing finger tip 120 which then moves rearwardly through the metering perforation 30 under the influence of the spring 84. Then as the film is advanced further the edge of the perforation 30 moves the sensing finger 76 to the left-hand end of the aperture 108 in the rear wall 110 of the chamber 74 (see FIG. 4). When it reaches this point the pawl 72 has been pivoted by the spring 84 about the rear edge of right wall 96 sufficiently to move the nib-like projection 107 out of the path of travel of the notch 118 in the shutter release member 42 so that the latter can again be depressed and the shutter 46 tripped.

The shutter release member 42 is provided with a rib or cam surface 124 which engages the L-shaped front portion 80 of the member and pushes it forwardly against the force of the tension spring 84 as the member is depressed and the shutter mechanism 40 tripped. As the pawl moves forward the sensing finger 76 moves out of the film perforation 30 allowing the tension spring 84 to move it quickly to the right toward the position which it occupied after the camera was loaded with film, but before the film 26 was advanced (see FIGS. 1 & 5). Then as the compression spring 52 raises the shutter release member 42, the pawl's front portion 80 slides slowly rearwardly along the cam's surface under the influence of the tension spring 84. When the shutter release member 42 has been moved upwardly to its original position the notch 118 is aligned with the pawl 72 and the pawl is pivoted around the rear edge of the right wall 96 until the nib 107 fills the notch 118 and depression of the shutter release member 42 is prevented. The depression 114 on the shutter release member 42 and the protrusion 116 on the pawl ensure that the nib 107 lies in the notch 118 whenever the sensing finger lies against the film 30.

Operation of the pawl 72 as above described not only serves to prevent double exposures from being made by preventing depression of the shutter release member when the nib 107 lies in the notch 118, it also serves to lock the film advance mechanism against further winding or advancement whenever a portion of unexposed film is suitably framed in the camera. This locking is performed in essentially the manner disclosed in the aforementioned U.S. Pat. No. 3,605,591 and employs the previously mentioned locking pawl 70 for this purpose. The locking pawl 70 includes a recess 126 through which the sensing finger portion 76 of the pawl 72 extends into the aperture 108. This locking pawl is maintained in a vertical position with respect to the plane of the pawl by a narrow housing 128 in which its upper end 130 (shown in dashed lines in FIG. 1) is positioned so it can reciprocate back and forth for engagement with and disengagement from the axially oriented peripheral teeth 68 of the winding knob 62. When the camera is ready to take a picture the sensing finger 76 moves the pawl 70 into engagement with the teeth 68 and the film winding mechanism 12 is locked. When the sensing finger 76 is pulled out of the film perforation 30 and is moved to the right by the tension spring 84, as previously described, the locking pawl 70 is moved to the right out of engagement with teeth 68, thereby unlocking the film winding mechanism 12. The fit between the sensing finger 76 and the recess 126 in the locking pawl 70 is relatively snug so that though the finger is free to move forward and backward through the plane of the pawl, any movement of the finger 76 to the right or left as viewed in FIGS. 3 & 4 causes the locking pawl to move substantially the same distance and in the same direction.

Though the invention has been described in connection with an embodiment in which a film cartridge is clipped onto the camera, it should be clear that the invention may also be employed in cameras in which the film cartridge does not form part of the rear or camera's back, but rather is wholly enclosed within the camera itself when fully loaded therein. Preferably the metering pawl 72 is stamped out of sheet metal as are the locking pawl 70, the rear wall 110 and the shutter release member 42. However, if desired, one or more of these elements may also be made from any satisfactory plastic material such as Delrin which is manufactured by the DuPont de Nemours of Wilmington, Delaware.

Further, other and additional modifications to the preferred embodiment which has been described may be made within the scope and spirit of the invention.

What is claimed is:

1. In a photographic camera having a shutter release member and a double exposure prevention system including a one-piece metering pawl which is movable along its length and has two ends, a sensing finger portion defining one of these ends for metering the passage of film through the camera and a projection portion adjacent to but spaced from the other of these ends, the improvement comprising means including a portion of the shutter release member and a portion of the pawl defining a recess between the projection portion and said other end of the pawl which cooperates with said shutter release member portion to permit actuation thereof when there is no film in the camera.

2. In a camera having a double exposure prevention system according to claim 1 wherein said means includes spring means attached to the pawl and the camera for urging the pawl rearwardly and for positioning the recess in the path of travel of the shutter release member when actuated whenever there is no film in the camera.

3. In a camera having a double exposure prevention system according to claim 2 wherein said portion of the shutter release member defines a notch and the pawl's projection is positioned in the notch to prevent actuation of the shutter release member when the camera is loaded with film but the camera is not ready to take a picture.

4. In a photographic camera having an impact shutter and adapted to support a film cartridge which includes spaced parallel spools and a narrow compartment through which film having spaced metering holes is adapted to pass as it is wound off one spool onto another; winding means adapted to cooperate with one of said spools to advance the film past a framing window in the cartridge, a one-piece metering pawl which is movable along its length and has two ends, a sensing finger portion defining one of these ends and a projection portion adjacent to but spaced from said other end, the improvement comprising means including a shutter release member having a portion and a portion of the pawl defining a recess between the projection portion and said other end for permitting actuation of the shutter release member when there is no film in the camera, said means also includes a spring means for urging the finger against the film so that it enters one of the metering holes as the film advances, the shutter release member portion defining a notch in a predetermined location therein which cooperates with the pawl's projection to prevent actuation of the shutter release member whenever a film cartridge is loaded in the camera but the camera is not ready to take a picture, and the pawl's recess is aligned with the shutter release member portion whenever there is no film or cartridge loaded in the camera, thus permitting the shutter release member to be actuated.

5. In a camera having a double exposure prevention system according to claim 4 wherein the camera includes a wall member about which the pawl is pivotable between its ends and the spring means urges the pawl pivotally about the wall member in a predetermined direction so that said other end of the pawl contacts the shutter release member thereby aligning the pawl's recess with the notch in the shutter release member whenever there is no film cartridge in the camera, the pawl's projection being moved forward into the notch by forward movement of the sensing finger on insertion of the cartridge into the camera.

6. The combination according to claim 5 wherein there is a locking pawl in the camera operated by the metering pawl for locking the camera against further film advance whenever sufficient unexposed film has been suitably framed for taking a picture.

* * * * *